Figure 1:
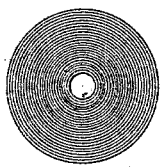

(No Model.)

A. A. COWLES.
MANUFACTURE OF ELECTRIC CONDUCTORS.

No. 295,232. Patented Mar. 18, 1884.

UNITED STATES PATENT OFFICE.

ALFRED A. COWLES, OF NEW YORK, N. Y., ASSIGNOR TO THE ANSONIA BRASS AND COPPER COMPANY, OF ANSONIA, CONNECTICUT.

MANUFACTURE OF ELECTRIC CONDUCTORS.

SPECIFICATION forming part of Letters Patent No. 295,232, dated March 18, 1884.

Application filed December 20, 1883. (No model.)

*To all whom it may concern:*

Be it known that I, ALFRED A. COWLES, of the city and State of New York, have invented an Improvement in the Manufacture of Electric Conductors, of which the following is a specification.

In the manufacture of electric conductors a strip or tape of woven material is saturated with a water-proof material of bituminous character, which sets or hardens sufficiently to be wound into rolls, and subsequently it is applied as a winding or wrapping around the wire or around the covering upon the wire. Conductors made in this manner are represented in my Patent No. 281,841, and in pending application filed October 22, 1883. Rolls of this adhesive tape may also be seen in Patent No. 288,454. In applying this adhesive tape to the wire direct, or to the surface of a wound or braided covering to the wire, I have found difficulties that sometimes produce imperfections in the covered conductor. The tape is adhesive; hence with the roll the woven material is sometimes torn in loosening the end to unwind it, and as the tape is drawn off from the roll the adhesion is more at one part than at another part; hence the tension applied to the tape as it is wound around the conductor varies, and the conductor is caused to adhere less firmly at some places. Again, the adhesive tape is liable to have moisture upon its surface, and this interferes with the adhesion of the tape, and, being tightly incased, becomes a source of danger to the conductor when in use. Atmosphere is also inclosed by the adhesive tape, because of the stiffness of such tape preventing the same from conforming to the surface of the conductor.

My present invention relates to a method by which the aforesaid difficulties are prevented or overcome, so that the conductor is made better and risk of injury during use is effectually prevented.

I take a strip or tape of woven fabric and saturate the same with bituminous or other water-proof adhesive insulating material, the said tape or strip being drawn through such material while the latter is in a melted condition. The surplus material is removed, and the strip is wound up into a roll. In this condition the water-proof adhesive material is in a condition adapted to transportation, and it has heretofore been placed in the taping or covering machine without any other preparation. Before the roll of prepared water-proof adhesive insulating tape is made use of, I heat the same with uniformity to a temperature of about 180° Fahrenheit, upon a table heated by steam, or in an oven or chamber. The heat serves to dispel any moisture that may be upon the roll, to soften the adhesive water-proof material upon the tape sufficiently to allow the tape to unwind easily from the roll without being irregularly stuck together, to render the tape flexible, so that it will conform to the surface upon which it is applied, and also to cause the tape to adhere more firmly to its place without either moisture or atmosphere intervening between the tape and the surface to which it is applied, thus greatly improving the product and facilitating the winding operation, so that it may be done much more rapidly than heretofore.

Figure 2:
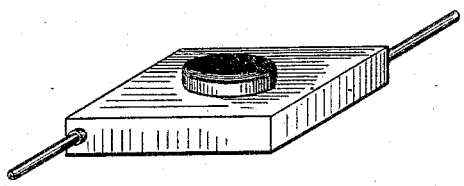
Figure 3:
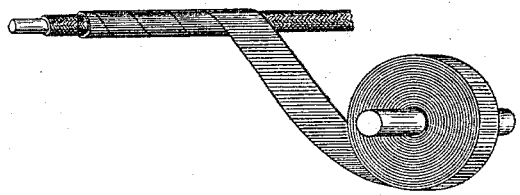

In the drawings, Figure 1 represents a coil of the adhesive tape; Fig. 2, a steam-table with a coil thereon as being heated; and Fig. 3 represents a conductor upon which the adhesive tape is being wound from a coil.

I claim as my invention—

The method herein specified of preparing flexible adhesive water-proof tape and applying it to the conductor, consisting in rolling the tape after the same has been impregnated with such waterproofing material, and afterward heating the roll of tape to expel moisture and soften the adhesive waterproofing material, and applying such tape, while in the hot condition, to the conductor, substantially as and for the purposes set forth.

Signed by me this 28th day of November, A. D. 1883.

ALFRED A. COWLES.

Witnesses:
GEO. T. PINCKNEY,
WILLIAM G. MOTT.